O. E. WALKER.
Machine for Mixing-Meat.

No. 202,206.  Patented April 9, 1878.

Attest:  Inventor:

UNITED STATES PATENT OFFICE.

ORRIN E. WALKER, OF JAMESTOWN, NEW YORK.

IMPROVEMENT IN MACHINES FOR MIXING MEATS.

Specification forming part of Letters Patent No. 202,206, dated April 9, 1878; application filed January 12, 1878.

*To all whom it may concern:*

Be it known that I, ORRIN E. WALKER, of Jamestown, in the county of Chautauqua, in the State of New York, have invented a new and useful Improvement in a Machine for Mixing Meat, which improvement is fully set forth in the following specification and accompanying drawings, in which—

Figure 1:
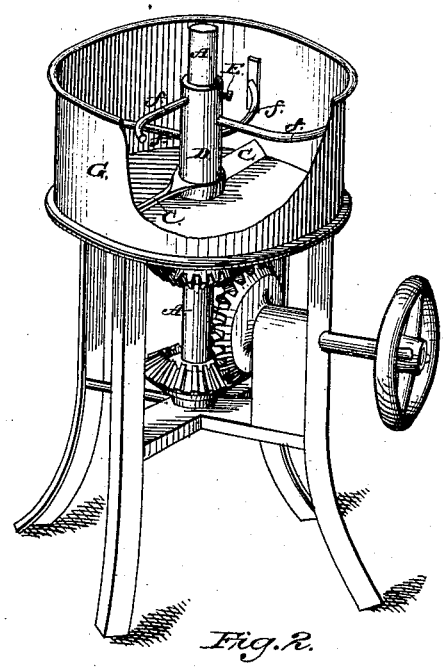
Figure 2:
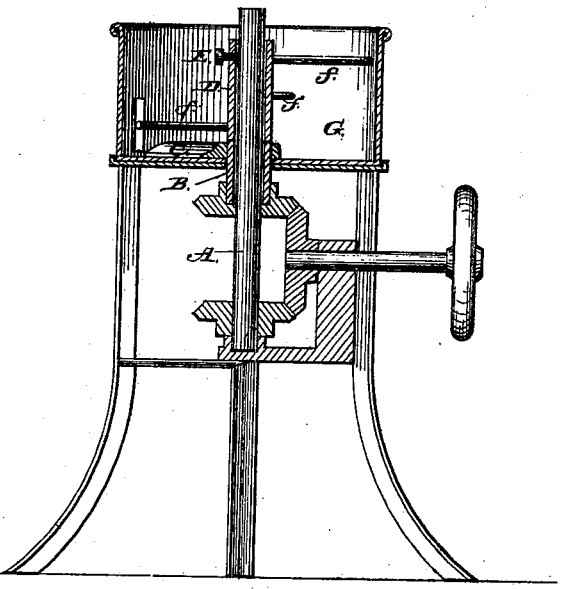

Figure 1 is a perspective view of a meat-mixer constructed with my improvement. Fig. 2 is a vertical section of said machine.

The object of my invention is to furnish a device for mixing sausage and other meats.

In the drawings, A is the central or solid shaft. B is a hollow shaft, surrounding A. C is the lower of the mixing-arms, and is fitted to the hollow shaft B, and made to revolve therewith by means of a spline. D is a hollow shaft, which is attached to and made to revolve with the shaft A by means of the set-screw E, and bearing the upper mixing-arms $f f f$. G is the cylinder containing the meat to be mixed, and in which the mixing-arms revolve.

It will be seen from the foregoing that when the shafts are revolved by their gear the lower arms, revolving in one direction, lift up the meat from the bottom, throwing the lower portions thereof into contact with the upper arms, revolving in the other direction, and by continued action thoroughly mixing the same; and that by simply loosening the set-screw E the shaft bearing the upper arms can be easily removed, and then the lower arms lifted out, by which the removal of the mixture is greatly facilitated, and then the tub or cylinder can be also removed, and all parts coming in contact with the mixture thoroughly and easily cleansed.

Having thus described my invention, what I claim as new, and desire to secure by Letters Patent, is—

1. The lower arm C, having the central aperture through the same, with spline to removably connect said arm to the hollow shaft B.

2. The combination of the shaft A, carrying the hollow shaft D, with its mixing-arms, with the shaft B, carrying the removable arm C, all in connection with the cylinder G, (the shafts to be actuated by gear or other proper device placed under the cylinder G,) all substantially as shown and described.

O. E. WALKER.

Witnesses:
JAMES J. FOWLER,
JEROME B. FISHER, Jr.